(12) United States Patent
Budd

(10) Patent No.: US 9,615,552 B2
(45) Date of Patent: Apr. 11, 2017

(54) FISHING LURE

(71) Applicant: Halco Pty Ltd, Fremantle (AU)

(72) Inventor: Gregory Michael Budd, Fremantle (AU)

(73) Assignee: HALCO PTY LTD, Fremantle Western Australia (AU)

( * ) Notice: Subject to any disclaimer, the term of this patent is extended or adjusted under 35 U.S.C. 154(b) by 498 days.

(21) Appl. No.: 14/071,907

(22) Filed: Nov. 5, 2013

(65) Prior Publication Data

US 2014/0123540 A1     May 8, 2014

(30) Foreign Application Priority Data

Nov. 6, 2012 (AU) ................................ 2012904874

(51) Int. Cl.
*A01K 85/14* (2006.01)
*A01K 85/16* (2006.01)

(52) U.S. Cl.
CPC ................................. *A01K 85/16* (2013.01)

(58) Field of Classification Search
CPC ..................................................... A01K 85/00
USPC ......................................................... 43/42.02
See application file for complete search history.

(56) References Cited

U.S. PATENT DOCUMENTS

| | | | | |
|---|---|---|---|---|
| 1,831,870 A * | 11/1931 | McIntosh | | A01K 85/02 43/42.15 |
| 4,208,822 A * | 6/1980 | Bryant | | A01K 85/01 43/42.02 |
| 5,140,930 A * | 8/1992 | Lund | | B63B 1/20 114/290 |
| D331,562 S * | 12/1992 | Graf | | D12/300 |
| 5,188,049 A * | 2/1993 | Graf | | B63B 1/12 114/61.2 |
| 5,894,692 A * | 4/1999 | Firmin | | A01K 85/00 43/4.5 |
| 6,112,450 A * | 9/2000 | Studanski | | A01K 85/14 43/42.03 |
| 7,234,266 B2 * | 6/2007 | Thomas | | A01K 85/00 43/42.02 |
| 8,490,319 B2 * | 7/2013 | Mancini | | A01K 85/00 43/42.09 |
| 2001/0049900 A1 * | 12/2001 | Peck | | A01K 85/16 43/42.39 |
| 2002/0189150 A1 * | 12/2002 | Thorne | | A01K 85/18 43/42.15 |
| 2008/0047477 A1 * | 2/2008 | Graf | | A01K 97/05 114/61.21 |
| 2008/0289244 A1 * | 11/2008 | Parks | | A01K 85/00 43/42.3 |
| 2013/0269235 A1 * | 10/2013 | Mancini | | A01K 85/00 43/17.6 |
| 2013/0318856 A1 * | 12/2013 | Rice | | A01K 85/00 43/42.02 |

(Continued)

*Primary Examiner* — Shin Kim
(74) *Attorney, Agent, or Firm* — Clark & Brody

(57) ABSTRACT

The present invention discloses a fishing lure having a body and a means for skimming. The means for skimming comprises a strike plate arranged on an underside of the body and configured to provide a force bearing lower surface for communicating with the surface of a water body for providing improved fluid dynamic characteristics of the lure when in use. The lure may be a unitary item or assembled together by joining the body to the means for skimming.

12 Claims, 17 Drawing Sheets

(56) References Cited

U.S. PATENT DOCUMENTS

| | | | |
|---|---|---|---|
| 2014/0059916 A1* | 3/2014 | Culver | A01K 85/00 43/42.02 |
| 2014/0123540 A1* | 5/2014 | Budd | A01K 85/16 43/42.02 |
| 2015/0208627 A1* | 7/2015 | Coniglio | A01K 85/00 43/42.24 |
| 2015/0282464 A1* | 10/2015 | Brink | A01K 85/00 43/4.5 |

* cited by examiner

FISHING LURE

FIELD

The present invention relates to fishing lures and in particular to a surface lure.

BACKGROUND

It is known to use a lure attached to a fishing line to improve the likelihood of catching a fish, and there are a wide variety of known fishing lures available on the market. Many known lures imitate one or more aspects of an actual fish, such as colour, shape, size, sound and/or behaviour in an attempt to attract a larger predatory fish to attack the lure and thereby become hooked on one or more barbs and caught by an angler.

Surface fishing lures are designed to move across the surface of the water when the lure is in motion such as when trolling behind a boat or being retrieved by an angler. Known surface lures can be either floating or non-floating when stationary. It is known for surface lures to be designed to have features such as a cupped face to cause splash, fins or blades that spin and/or create a fizzing sound as they move across the water surface thereby attracting the attention of predatory pelagic fish species.

However at increased retrieval or travel speeds the stability of known surface lures may be compromised with the lure randomly bouncing across the water surface and becoming less effective in simulating the movements of a fish.

Other known fishing lures are designed to move below the surface of the water when the lure is in motion. Such submerging lures are typically arranged to have a bib at the front end of the lure which has a downward orientation that urges the lure into a nose dive and thereby pulls the lure under the surface of the water as it is moved in a forward direction. The actual swimming depth of a submerging lure can be generally controlled by the size of the bib and so can therefore be used to target specific fish species.

The present invention attempts to provide a useful alternative to existing known fishing lures.

SUMMARY OF THE INVENTION

In accordance with one aspect of the present invention there is provided a lure for use with fishing tackle to catch fish in a water body, the lure comprises a body having a length along a longitudinal axis, the body comprising a head portion and an opposed tail portion, the head portion and the tail portion being separated by a middle portion, the lure comprising connection means for connecting to the fishing tackle, and means for skimming, wherein the means for skimming is arranged, in use, to impact against a surface of the water body for facilitating a controlled movement of the lure across the surface.

In the preferred embodiment the means for skimming comprises a strike plate having at least a force bearing lower surface arranged, in use, to be in substantial contact with the water surface for enabling the lure to skim across the surface of the water body.

Preferably the means for skimming is disposed on an underside portion 15 of the lure and proximal the head portion of the body.

Preferably the lower surface defines a front edge distal the tail portion wherein the lower surface is arranged to be inclined upwardly toward the front edge and in use acts generate a lift force as the moves across the r surface thereby reducing a drag force on the lure.

Preferably the strike plate comprises a portion extending longitudinally and/or laterally beyond the body of the lure.

Preferably the strike plate comprises a plurality of spaced apart lower surfaces.

Preferably the lure and the means for skimming comprise a resinous material.

Preferably the connection means is disposed at least in part on the means for skimming.

Preferably the body of the lure has an upperside portion and an underside portion, the upperside and the underside portions respectively shaped and coloured to visually resemble a bait fish or other aquatic creature.

Preferably the body further comprises a stabilising portion disposed on the underside portion proximal the tail end of the body, the stabilising portion comprises a substantially flat face which, in use, impacts with the surface when the lure is moving.

Preferably the connection means provides connection to at least an elongate support line and a hooking means.

Preferably the connection means comprises one or more eyelets fixed to the lure, and in a preferred embodiment the connection means comprises an eyelet proximal the head portion for connecting to the elongate support line, and a respective eyelet proximal the tail portion and middle portion for connecting to the hooking means.

Preferably the hooking means comprises a barbed hook.

In accordance with a further aspect of the present invention there is provided a lure 10 comprising a first portion and a second portion, the first and second portions preferably arranged to be slidably connected with each other during an assembly of the lure 10 into a unitary piece.

Preferably the first portion substantially comprises the body of the lure 10 and the second portion substantially comprises the means for skimming.

Preferably the lure 10 further comprises detent means for a limiting movement between the first portion and the second portion. In a preferred embodiment the detent means comprises at least one biased finger disposed on the first portion, and a complementary recess disposed on the second portion, the recess adapted to receive and restrain the finger as the first and second portions are slidably moved from a first unassembled position to a second assembled position.

BRIEF DESCRIPTION OF THE DRAWINGS

The present invention will now be described, by way of example, with reference to the accompanying drawings, in which.

DETAILED DESCRIPTION OF THE PREFERRED EMBODIMENT

Figure 1:
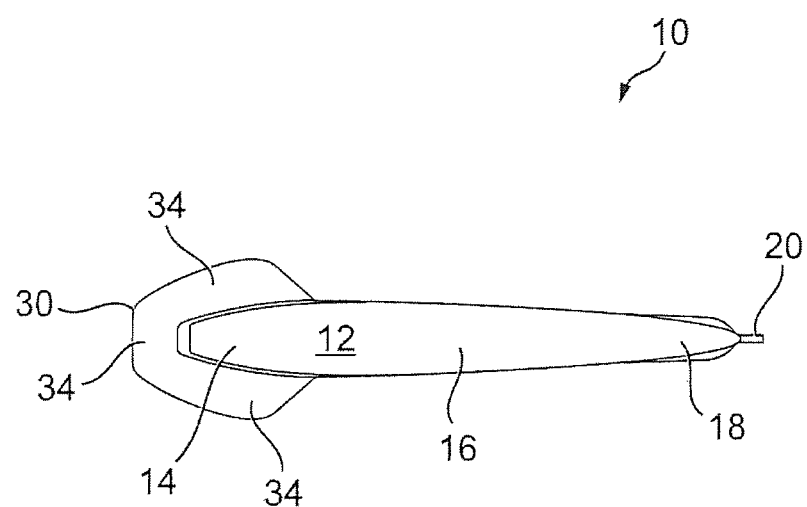
FIG. 1 is a plan view of a fishing lure in accordance with a preferred embodiment of the present invention.

Referring to FIG. 1, there is shown a fishing lure 10 for use with fishing tackle to catch fish in a water body in accordance with a preferred embodiment of the present invention. The lure 10 comprises a body 12 having a head portion 14, a middle portion 16 and a tail portion 18.

Figure 3:
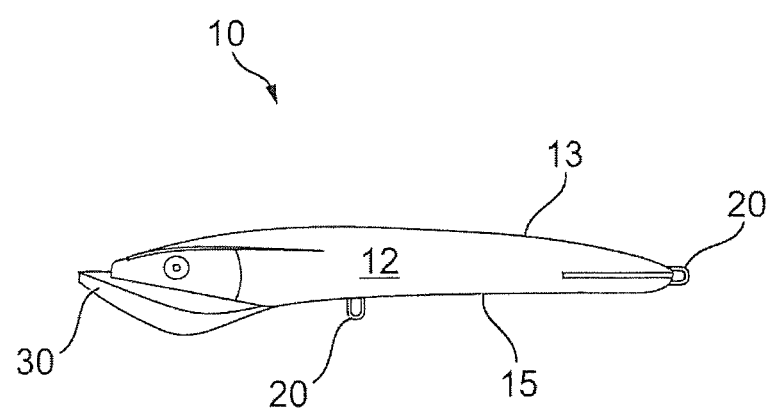
FIG. 3 is a side view of the fishing lure of FIG. 1.

As shown in the FIG. 3 the body 12 comprises an upperside portion 13 which generally faces away from a water surface in use and a underside portion 15 which faces towards the water surface in use. The upperside and lowerside portions 13,15 will be configured in size, shape and colour to substantially resemble a bait fish and may typically comprise features such as eyes, gills, fins and scales for example as is known in the art.

The lure 10 may further comprise internal cavities comprising ball bearings or other such components which are capable of generating a sound for drawing the attention of predatory pelagic fish.

Figure 6:
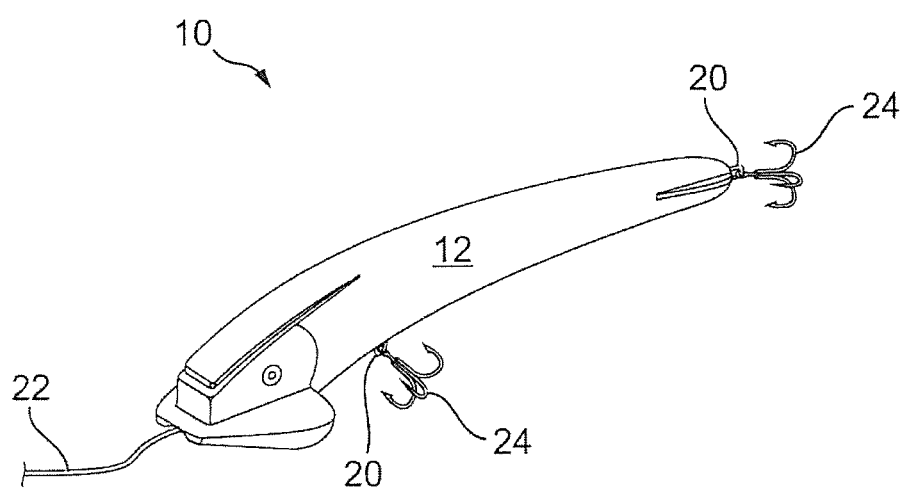
FIG. 6 shows the fishing lure of FIG. 5 fitted with tackle ready for use.

As seen in FIGS. 1 to 5, the lure 10 further comprises connection means for connecting the lure 10 to the fishing tackle. In the preferred embodiment shown in FIG. 6 the connection means comprises one or more eyelets 20 fixed to the body 12 and spaced along the lure 10. Each eyelet 20 typically comprises a metallic ring which is adapted for connection to known fishing tackle elements including an elongate support line 22, such as a fishing line or swivel for example, and/or hooking means. The hooking means may comprise any known hook such as for example a single, double or triple barbed hook 24 as is known in the art.

Alternate embodiments (not shown) of the present invention may comprise, lure 10 having hooking means integral with the body 12.

As can be seen in the Figures the lure 10 further comprises means for skimming. The means for skimming is arranged to facilitate a movement of the lure 10 across the surface of the water when a force is applied to the lure 10 via the elongate support line 22 as is generally the case when fishing from a moving water vessel or retrieving the lure 10 using a fishing reel for example. In the present embodiment the means for skimming comprises a strike plate 30 having at least a lower surface 32 adapted for contact with the surface of the water for facilitating, in use, a skimming of the lure 10 across the surface.

Figure 2:
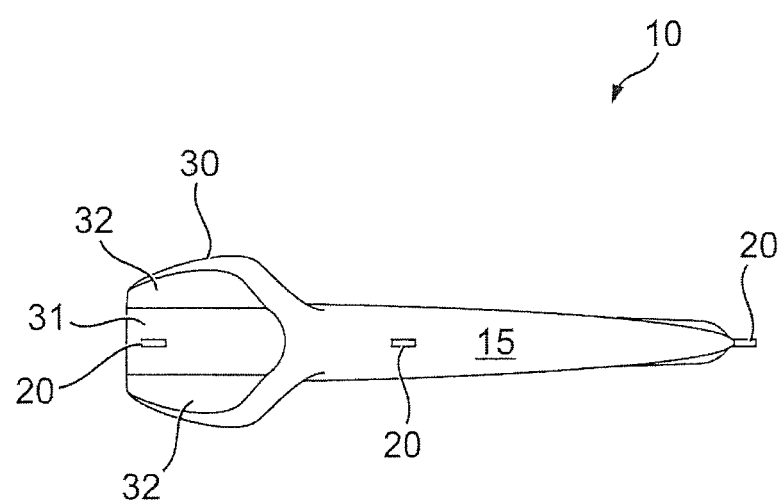
FIG. 2 is a bottom view of the fishing lure of FIG. 1.
Figure 4:
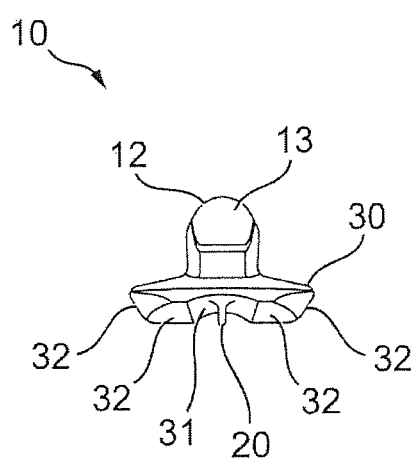
FIG. 4 is a front view of the fishing lure of FIG. 1.
Figure 5:
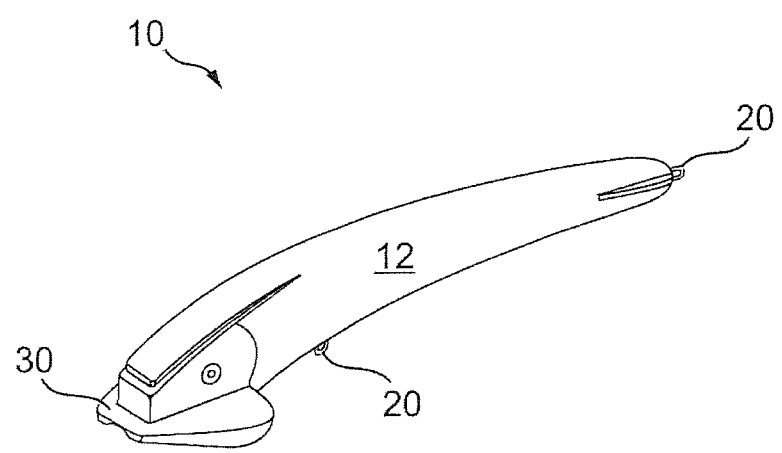
FIG. 5 is a perspective view of the fishing lure of FIG. 1.

In a preferred embodiment of the present invention shown in FIG. 2 the means for skimming comprises a plurality of lower surfaces 32. Preferably at least two lower surfaces 32 are spaced apart and separated from one another by a recessed portion 31. The recessed portion 31 is arranged to have an arcuate configuration, as seen in FIG. 4. The recessed portion 31 substantially extends along a length of the strike plate 30 and is disposed to be collinear with a longitudinal axis of the lure 10 thereby providing for a configuration of at least two spaced apart and generally parallel lower surfaces 32 as seen in FIGS. 2 and 4.

As shown in FIGS. 2 to 6 the strike plate 30 of the preferred embodiment of the present invention is disposed on the underside portion 15 of the lure 10 proximal the head portion 14 of the body 12. As illustrated in FIG. 1 the strike plate 30 comprises one or more laterally and longitudinally extending flanges 34. It should be understood that the flanges 34 permit a greater surface area of the lower surface's 32 for contacting the surface of the water.

It should be understood that the means for skimming provides at least a force bearing lower surface 32 that facilitates a surface lure characteristic. The strike plate 30 essentially provides a water ski upon which the body 12 of the lure 10 is mounted. Accordingly in the preferred embodiment the one or more lower surface/s 32 comprise a portion having an upwardly inclined configuration as seen in FIG. 3. The lower surface/s 32 may have a rounded hull like configuration shown in FIG. 4 for assisting to stabilise the lure 10 in use and for reducing friction or drag orces which are induced as the lure 10 is propelled across the water surface at speed.

Furthermore, it is also to be understood that the lower surface/s 32 may provide a resultant upward thrust force resulting from the impact with the water surface during motion of the lure 10. The upward force applied to the lure 10 from the lower surfaces 32 limits the lure 10 from being drawn under the surface of the water. Further, the upward thrust force contributes to facilitating the skimming motion of the lure 10 across the water surface when the lure 10 is subject to a propulsive force from an elongate support line 22 connected with a reel or a water vessel for example.

Typically the upward inclination of the lower surface/s 32 will be in the range of 5 to 60 degrees from a horizontal plane substantially coplanar with the surface of the water and more preferably the inclination will be within the range of 15 to 30 degrees from the horizontal plane.

In the preferred embodiment shown in FIGS. 1 to 6 an eyelet 20 is disposed within the recessed portion 31 of the strike plate 30 for connection to the elongate support line 22. However in alternate embodiments the eyelet 20 for connection to the elongate support line 22 may be disposed at any point on the strike plate 30 or head portion 14 of the lure 10.

The means for skimming strike plate 30 may be an integral feature of the lure 10 or alternatively may be mechanically attached to the lure 10 and selectively removable from the lure 10 thereby permitting the lure 10 to have multiple and various configurations for use as desired by an operator.

Figure 7:
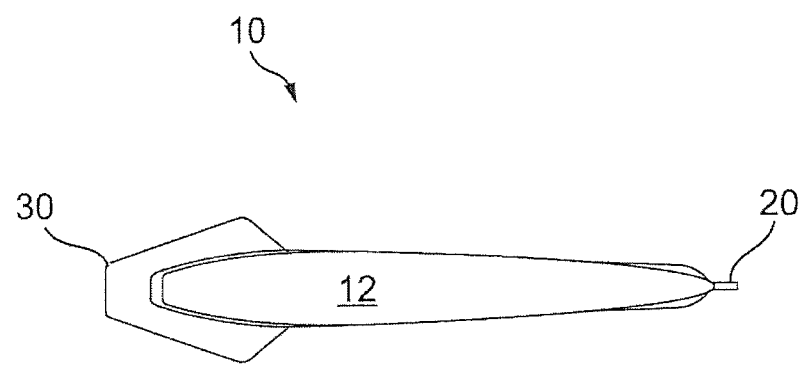
FIG. 7 is a plan view of a fishing lure in accordance with an alternative embodiment of the present invention.
Figure 8:
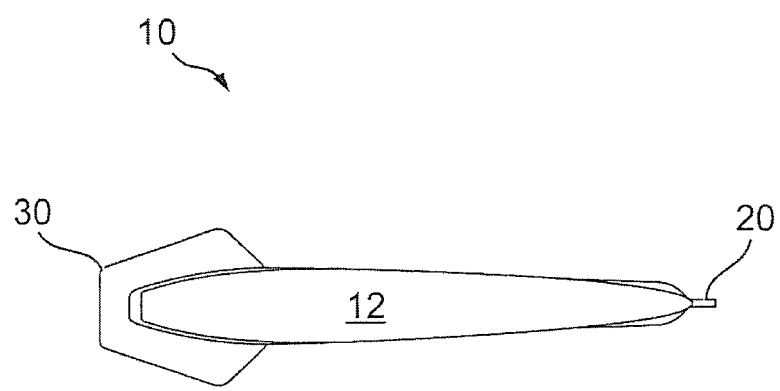
FIG. 8 is a plan view of a fishing lure in accordance with a further alternative embodiment of the present invention.
Figure 9:
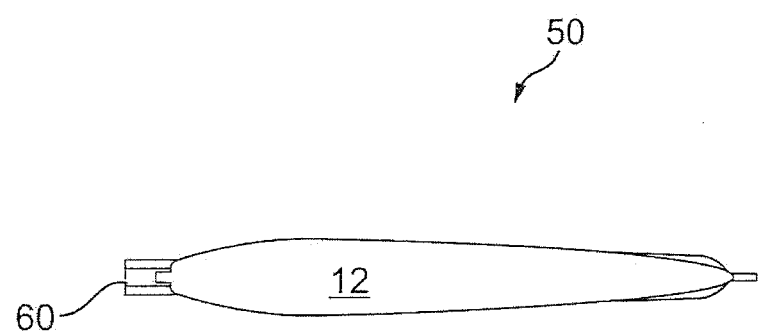
FIG. 9 is a plan view of a first portion of a fishing lure in accordance with a still further alternate embodiment of the present invention.
Figure 10:
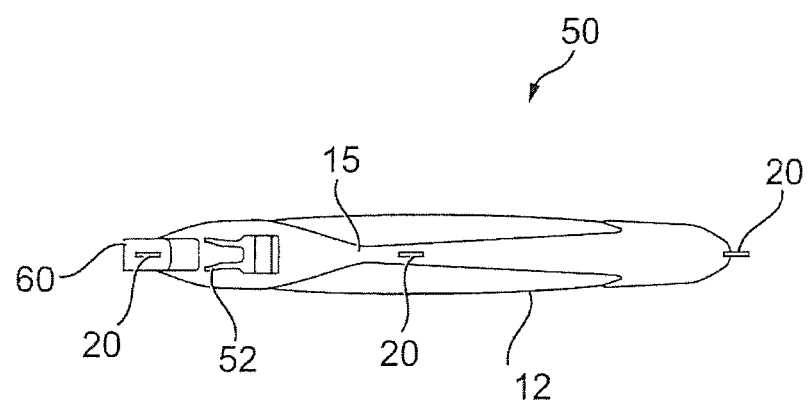
FIG. 10 is a bottom view of the first portion of a fishing lure of FIG. 9.
Figure 11:
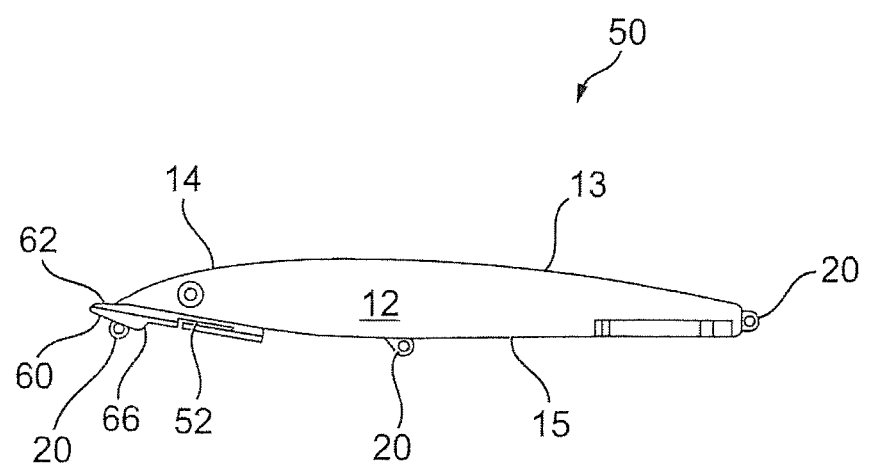
FIG. 11 is a side view of the first portion of FIG. 9.

As illustrated in FIGS. 7 and 8, alternative embodiments of the strike plate 30 may have various sizes, angles and shapes which alter the dynamics of the lure 10 in use. Therefore a lure 10 may be selectively assembled with any one of numerous strike plates 30 thereby providing an operator with a variable choice of features.

In accordance with the further aspect of the invention there is provided a fishing lure 10, as seen in FIGS. 9 to 17, which comprises a first portion 50 and a second portion 70 which are manufactured separately to one another. In this embodiment the lure 10 comprises detent means for connecting the first portion 50 and the second portion 70 together.

In the preferred embodiment shown in the FIGS. 9 to 17 the first portion 50 substantially comprises the body 12 and the second portion 70 substantially comprises the means for skimming strike plate 30. It is to be understood that variations to this embodiment would fall within the scope of the present invention.

It is to be understood that the first portion 50 or body 12 of the lure 10 will be shaped and or coloured to imitate a bait fish or other marine creature. In the preferred embodiment of the present invention the second portion may comprise a substantially clear material for ensuring that the assembled lure 10 maintains a genuine fish shape similar to that of a bait fish for example. However other alternative embodiments may comprise a second portion 70 and/or means for skimming which comprises a marked, coloured or solid appearance.

Figure 12:
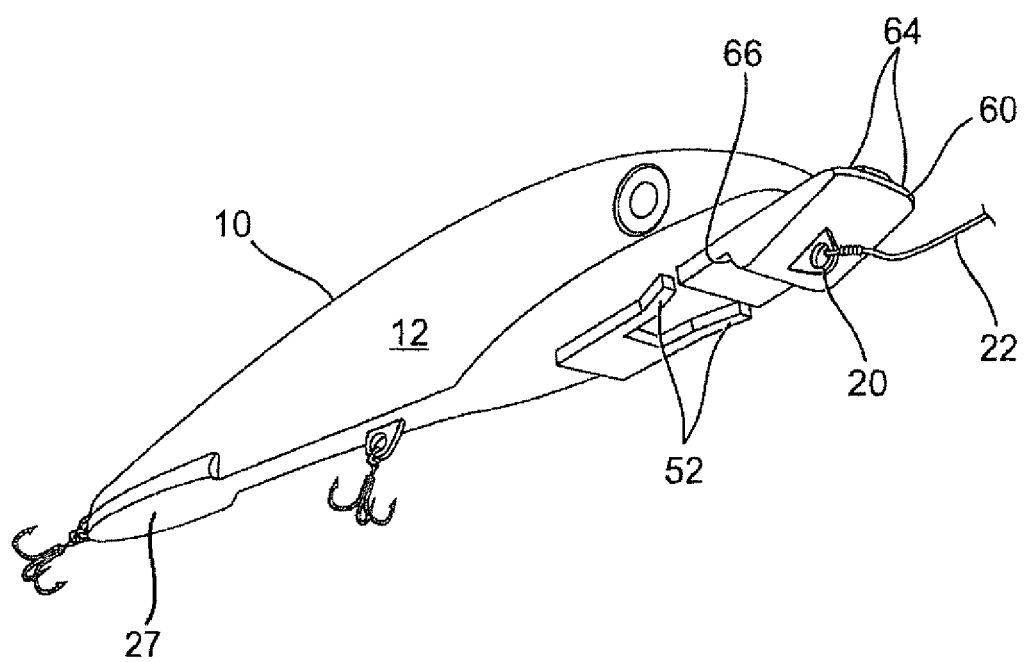
FIG. 12 is a lower perspective view of the first portion of FIG. 9.
Figure 13:
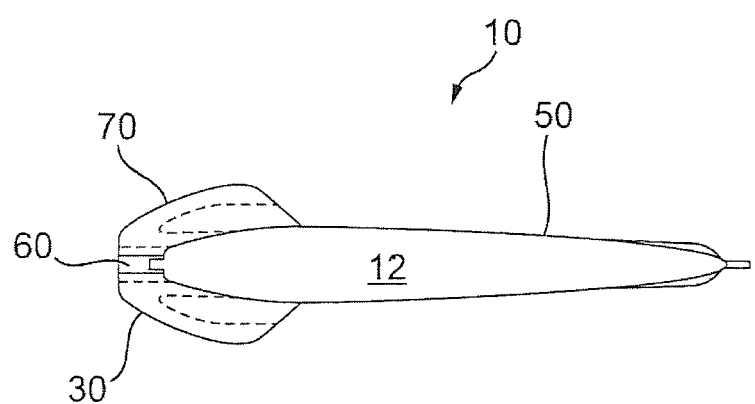
FIG. 13 is a plan view of the first portion of FIG. 9 fitted with a bib.
Figure 14:
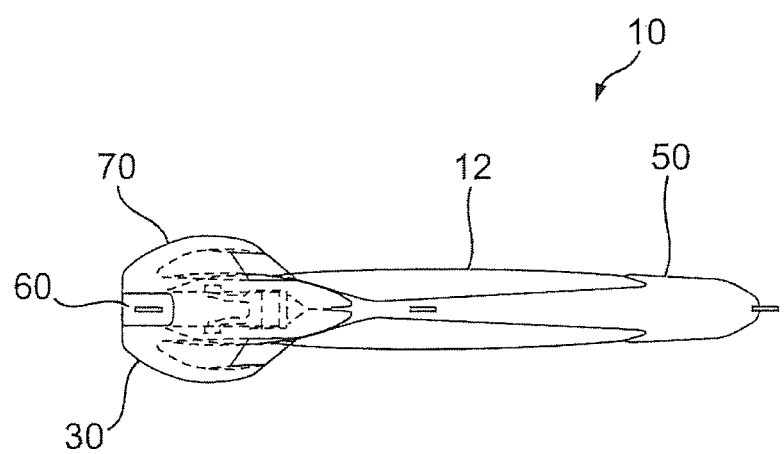
FIG. 14 is a bottom view of the lure of FIG. 13.
Figure 15:
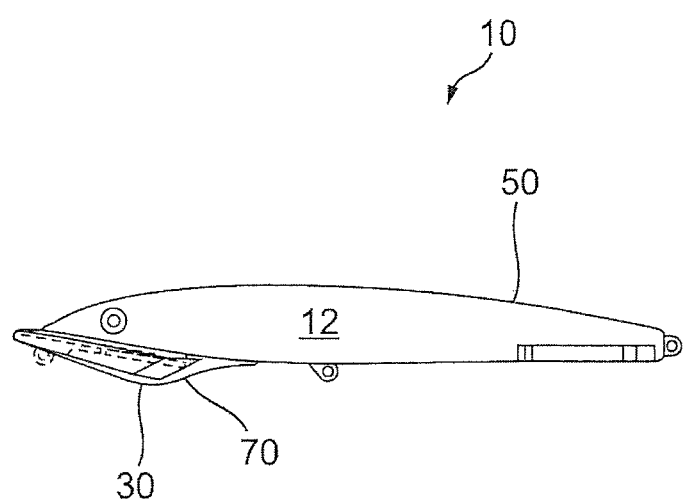
FIG. 15 is a side view of the lure of FIG. 13.
Figure 16:
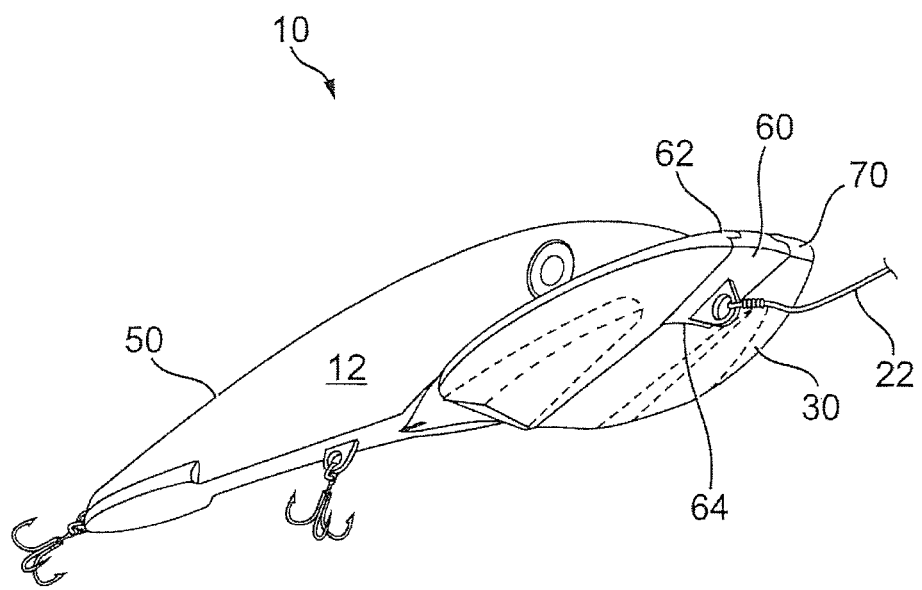
FIG. 16 is a lower perspective view of the lure of FIG. 13.

As seen in FIGS. 9 to 17, a preferred embodiment of the detent means comprises at least one biased finger 52, preferably a pair of fingers 52. Each finger 52 is configured to be biased outwardly. The fingers 52 are disposed on an underside portion 15 of the first portion 50 as can be seen in FIG. 12. The detent means further comprises one or more complementary recesses 72 disposed on the second portion 70. Each recess 72 is arranged to receive and restrain a complementary finger 52 during an assembly of the first and second portions 50,70.

Figure 17:
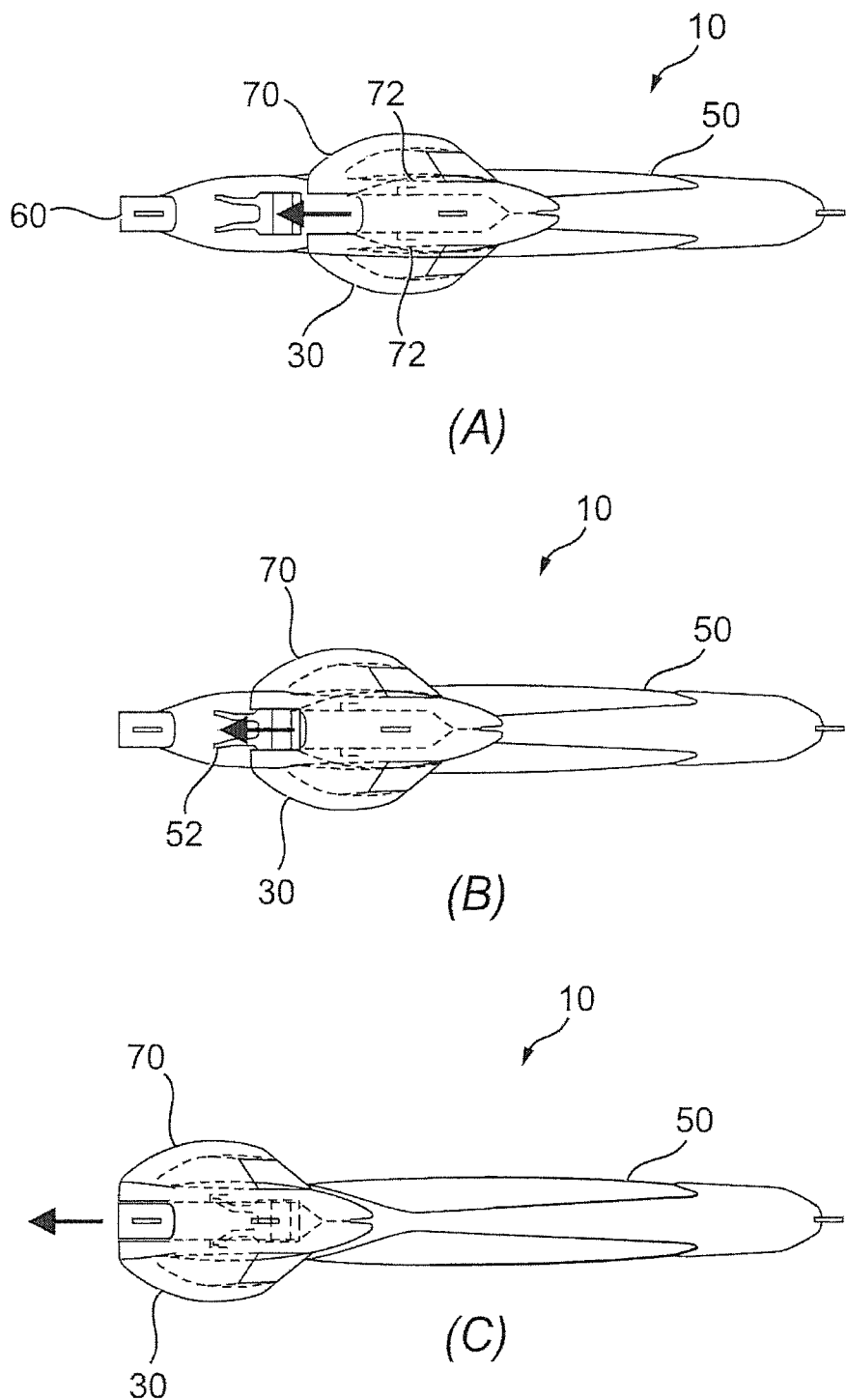
FIGS. 17 (A), (B) and (C) show a bottom view of a method of assembling a lure according to FIG. 13.

The detent means further comprises channel means 60 arranged such that the first and second portions 50,70 can be fitted together and selectively moved with a sliding action (as shown by the arrows in FIG. 17) between a first un-assembled position and a second assembled position. In the first position, as seen in FIG. 17(A), the first portion 50 and the second portion 70 are brought together such that the first and second portions engage one another via the channel means 60.

As seen in FIG. 17(B) the portions 50,70 are then moved relative to one another with enough force to overcome the finger's 52 bias until the second position is reached wherein the fingers 52 expand outwardly and are received into a respective recess 72 for holding the first and second portions 50,70 together as seen in FIG. 17(C). Once the first portion 50 and the second portion 70 are arranged in the second assembled position the lure 10 is ready to be connected with tackle via the connection means eyelets 20 and put to use.

The channel means 60 comprises a projection 62 disposed at the head portion 14 which is attached to the body 12 via a central column and which provides one and preferably two elongate slots 64 as seen in FIG. 12 for receiving complementary rails disposed upon the second portion 70. The channel means 60 are arranged such that the rails are received into the slots 64 thereby holding the first and second portions 50,70 together and facilitating a linear movement along the channel means 60 between the first and second positions.

The channel means 60 further comprises a step 66 against which the second portion 70 may abut when it reaches the second position.

The lure 10 according to the present invention may comprise detent means which are reversible, upon an application of a suitable force for example, allowing the first and second portions 50,70 to moved from the second position to the first position. However it is to be understood the detent means will selectively restrain the first portion 50 and the second portion 70 in the assembled in use position.

Preferably the lure 10 of the present invention is substantially constructed from a resinous material however various materials including plastics, rubbers, metals and wood may also be used. It is envisaged that a lure 10 in accordance with the present invention will be substantially buoyant when it is at rest in water.

Alternate embodiments may provide a lure 10 which is neutral or negatively buoyant.

As seen in FIG. 12 the present invention the lure 10 may comprises a stabilising portion disposed proximal an underside portion 15 of the body 12. The stabilising portion comprises a surface 27 which is slightly broader than an adjacent underside portion 15 which in use is dragged along or under the surface of the water for assisting to stabilise the skimming action of the lure 10.

In use, an operator will attach an assembled lure 10 to their fishing tackle, such as a fishing line 22 or clip for example, using the connection means eyelet 20 located at the head portion 14 of the body 12. Hooking means such as one or more barbed hooks may be fixed to eyelets 20 located elsewhere along the lure 10.

Once the lure 10 is connected to a fishing rod and its elongate support line 22 with the hooks 24 fitted the operator will use the lure 10 as is known in the art by casting the lure 10 into the water and winding a reel on the rod to generate a pulling force to retract the line 22 and retrieve the lure 10. As the line 22 is retrieved it pulls on the lure 10 thereby causing the lure 10 to begin moving in a forward direction with the head portion 14 foremost and the tail portion 18 rearmost.

Alternatively the lure 10 may be used from a moving water vessel thereby imparting a travelling speed pulling force upon the lure 10 without retrieving the support line 22. Typically a trolling water vessel may travel at a speed of around 6 knots however it is envisaged the lure 10 according to the present invention may provide controlled skimming across the water surface at slower speeds and at higher speeds which would often be the case when the lure 10 is used as a casting lure.

As the lure 10 moves relative to the water the strike plate 30 lower surface 32 engages with and skims over the water surface thereby limiting a force of water resistance acting on the lure 10 as a whole and allowing the lure 10 to glide or skim over the water surface. It is envisaged the recessed portion 31 will reduce a magnitude of wake created by the lure 10 by providing a passage through which water may pass without impacting on the lower surface/s 32 and also assists to stabilise the lure 10 by having the two lower surfaces 32 equally spaced about the connection means eyelet 20 thereby balancing the propulsive force which is imparted to the lure 10 by the support line 22.

During motion of the lure 10 the impact of water upon the lower surface 32 creates an upward lift or thrust force upon the lower surface 32 which assist in maintaining the body 12 of the lure 10 substantially above the water surface. The strike plate 30 also displaces water via the recessed portion 31 and/or a periphery of the lower surfaces 32 thereby creating a splash for attracting the attention of nearby fish and reducing the water turbulence generated by the moving lure 10.

Due to the advanced fluid dynamics of the present invention it is advantageously found that a retrieval speed or travel speed of the lure 10 may be increased with the lure 10 remaining substantially stable in its course across the surface of the water thereby enhancing the functionality of lure 10 at a greater range of speeds.

When a predatory fish is attracted to the lure 10, mistaking it as a bait fish or other prey, the predatory fish attacks the lure 10 from the rear or the sides attempting to bite or swallow the lure 10. In doing so the hooking means are bought into direct contact with, and piercing, the mouth or flesh of the predatory fish thereby hooking the predatory fish upon the lure 10. The operator can then retrieve the lure 10 with the hooked fish as is known in the art.

Modifications and variations as would be apparent to a skilled addressee are deemed to be within the scope of the present invention.

The invention claimed is:

1. A fishing lure, for use in catching fish in a body of water, the lure comprising an elongated body having a head portion, and a tail portion opposed to the head portion, the head portion and the tail portion being separated by a middle portion, the lure further comprising a means for skimming disposed on the underside portion and adjacent to the head portion, the means for skimming comprising a strike plate, which is separate, from but attached to the underside portion and comprises two laterally spaced interconnected lower surfaces, and a longitudinal lower recessed portion extending between the lower surfaces, each lower surface having a leading portion which is upwardly inclined relative to the elongated body.

2. The lure according to claim 1 wherein the recessed portion has a transverse arcuate configuration.

3. The lure according to claim 1, wherein the means for skimming is dimensioned to extend beyond the elongated body in at least a lateral dimension.

4. The lure according to claim 1, wherein the lure comprises a substantially resinous material.

5. The lure according to claim 1, wherein a propulsive force is applied to the lure via connection means.

6. The lure according to claim 5, wherein the connection means is disposed at least in part on the means for skimming.

7. The lure according to claim 5, wherein the connection means comprises one or more eyelets fixed to the lure for connecting to at least an elongate support line.

8. The lure according to claim 1, wherein the elongated body comprises a shape or color that visually resembles a bait fish.

9. The lure according to claim 1, wherein the body further comprises a stabilizing portion disposed on the underside portion proximal the tail portion, the stabilizing portion comprising a surface arranged to be dragged along or under the surface of the water for assisting the skimming action of the lure in use.

10. The lure according to claim 1 wherein elongated body and the strike means are arranged to be slidably moved between an un-assembled position and an assembled position.

11. The lure according to claim 10, wherein the lure comprises detent means for restraining the elongated body and the strike plate in the assembled position.

12. The lure according to claim 11 wherein the detent means comprises a biased finger disposed on the elongated body and a complementary recess disposed on the strike plate.

* * * * *